Figure 1:
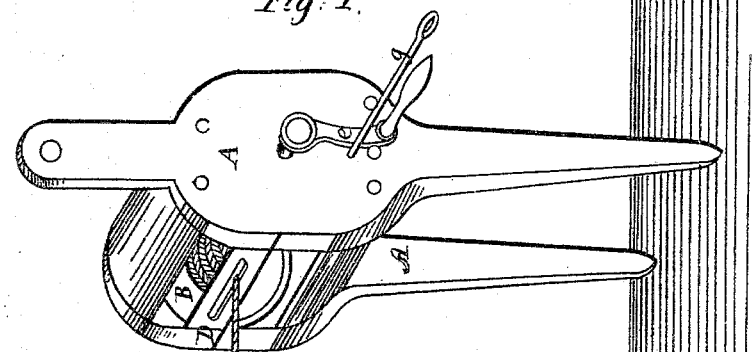

L. Martin.
Line-Reel.

Nº 73019  Patented Jan. 7, 1868.

Witnesses:  Inventor:

L. Martin.
Line-Reel.
N° 73019. Patented Jan. 7, 1868.
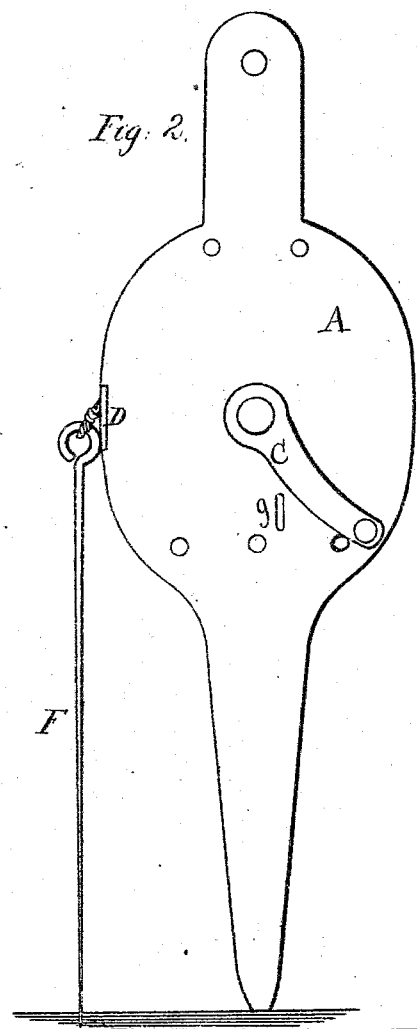
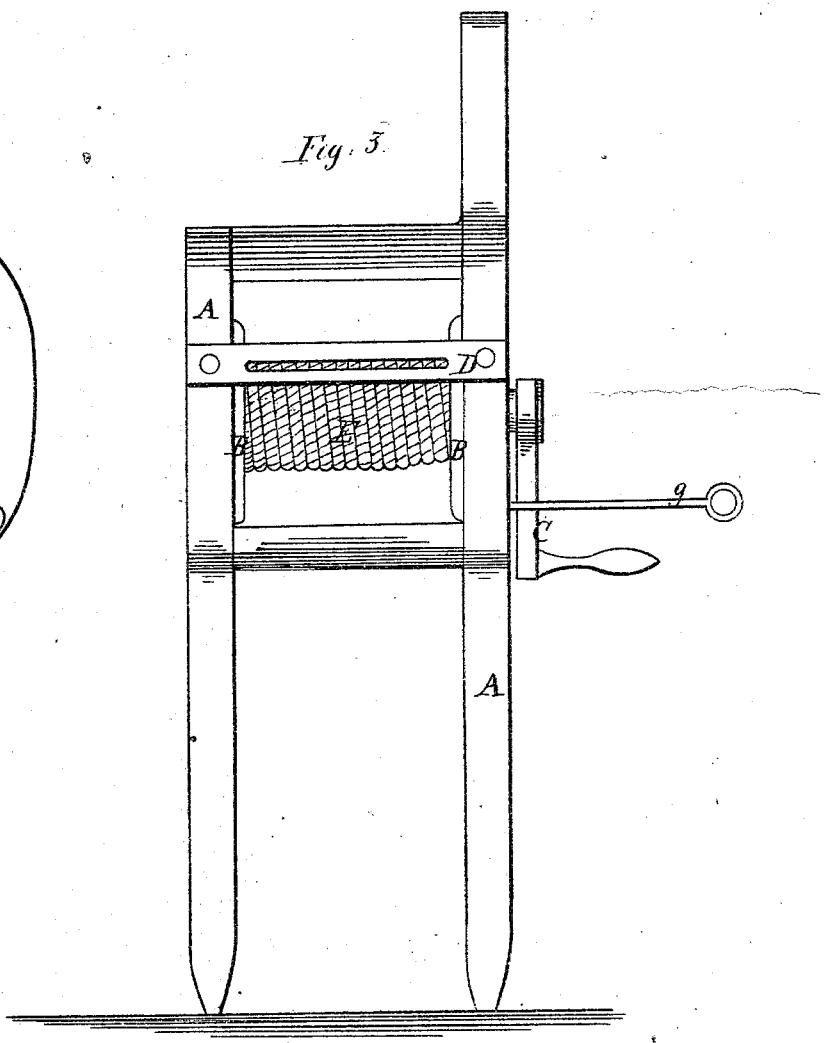
Witnesses:
Inventor:
Lyman Martin

United States Patent Office.

LYMAN MARTIN, OF INDIANAPOLIS, INDIANA.

Letters Patent No. 73,019, dated January 7, 1868; antedated December 18, 1867.

IMPROVEMENT IN LINE-REEL.

The Schedule referred to in these Letters Patent and making part of the same.

TO ALL WHOM IT MAY CONCERN:

Be it known that I, LYMAN MARTIN, of Indianapolis, in the county of Marion, and State of Indiana, have invented a new and useful Line-Reel for garden purposes, called "Martin's Line-Reel;" and I do hereby declare that the following is a full and exact description thereof, reference being had to the annexed drawings, and to the letters of reference marked thereon.

The nature of my invention consists in constructing a frame of iron or wood, as shown in Figure 1, A, and placing a drum or cylinder, B, inside of this frame, attaching a crank, C, to the axle of this drum, and putting a plate, D, of iron or brass, to the front of the reel. This plate is provided with a split for the rope E, which passes over the drum, to run through. To the end of the rope is fastened a pin, F. The pin G is put into the framework as a stop, when the rope is stretched.

Figure 2 represents an end view, and

Figure 3, a front view of the reel.

What I claim as my invention, and desire to secure by Letters Patent of the United States, is—

The combination of the frame A, drum B, crank C, the plate D, and pin G, for the purpose of a line-reel, all arranged and operating as set forth and described.

LYMAN MARTIN.

Witnesses:
   JNO. L. SMITHMYER,
   R. M. GOODWIN.